US009618125B2

(12) United States Patent
Kolakov

(10) Patent No.: US 9,618,125 B2
(45) Date of Patent: Apr. 11, 2017

(54) CONNECTOR FOR TRANSFERRING AT LEAST ONE FLUID

(71) Applicant: ANKOL EOOD, Sofia (BG)

(72) Inventor: Andrey Atanasov Kolakov, Sofia (BG)

(73) Assignee: ANKOL EOOD, Sofia (BG)

( * ) Notice: Subject to any disclaimer, the term of this patent is extended or adjusted under 35 U.S.C. 154(b) by 0 days.

(21) Appl. No.: 14/905,848

(22) PCT Filed: Jul. 2, 2014

(86) PCT No.: PCT/EP2014/064105
§ 371 (c)(1),
(2) Date: Jan. 18, 2016

(87) PCT Pub. No.: WO2015/007526
PCT Pub. Date: Jan. 22, 2015

(65) Prior Publication Data
US 2016/0152099 A1 Jun. 2, 2016

(30) Foreign Application Priority Data

Jul. 18, 2013 (EP) .................................. 13176984

(51) Int. Cl.
B60C 23/00 (2006.01)
F16J 15/34 (2006.01)
(Continued)

(52) U.S. Cl.
CPC ......... F16J 15/3448 (2013.01); B60C 23/003 (2013.01); B60S 5/04 (2013.01); F16J 15/346 (2013.01); F16J 15/40 (2013.01)

(58) Field of Classification Search
CPC . B60C 23/003; B60S 5/04; F16J 15/40; B60F 3/003
(Continued)

(56) References Cited

U.S. PATENT DOCUMENTS 2,657,731 A 11/1953 Gozzoli
4,019,552 A 4/1977 Tsuruta
(Continued)

OTHER PUBLICATIONS

International Search Report for PCT/EP2014/064105 mailed Aug. 14, 2014.
(Continued)

Primary Examiner — S. Joseph Morano
Assistant Examiner — Jean Charleston
(74) Attorney, Agent, or Firm — Thomas | Horstemeyer, LLP

(57) ABSTRACT

A connector (1) for transferring a fluid or for applying a pneumatic pressure from an inlet conduit (2) to an outlet conduit (3) that may rotate with respect to the inlet conduit (2), in which the connector (1) comprises a rotating shaft (17) defining the outlet conduit (3) therein, which has an inlet opening (70), said rotating shaft (17) defining a rotational axis (S-S) and comprising a sealing disc (19) extending radially from said rotating shaft; an insertion chamber (5) to which said inlet conduit (2) is sealingly securable, said chamber leading towards said inlet opening (70) of the outlet conduit (3); at least one first cylinder-piston unit (100) comprising a cylinder (9) and a piston (21) slidable in said cylinder (9), said piston (21) having a sealing surface (22) facing the sealing disc (19), and said cylinder (9) being fluidically connected or connectable to said insertion chamber (5); said piston (21) being configured to be selectively actuated between a sealing position in which the sealing surface (22) is at a minimum distance or in contact with the sealing disc (19), in which a fluidic seal is carried out between said insertion chamber (5) and said inlet opening (70) of the outlet conduit (3) of the rotating shaft (17), and a non-sealing position in which the sealing surface (19) is moved away from the sealing disc (19), in which a fluidic
(Continued)

seal is absent between said insertion chamber (5) and said inlet opening (70) of the rotating shaft of the outlet conduit (3) of the rotating shaft (17).

20 Claims, 8 Drawing Sheets

(51) Int. Cl.
*F16J 15/40* (2006.01)
*B60S 5/04* (2006.01)

(58) Field of Classification Search
USPC ............... 152/228, 415, 416, 417, 418, 419; 137/224, 226
See application file for complete search history.

(56) References Cited

U.S. PATENT DOCUMENTS

| | | | |
|---|---|---|---|
| 4,844,138 A | 7/1989 | Kokubu | |
| 7,051,777 B2* | 5/2006 | Tarasinski | B60C 23/003 137/224 |
| 9,308,788 B2* | 4/2016 | Fazekas | B60C 23/003 |
| 2007/0023083 A1* | 2/2007 | Huang | F16K 15/026 137/226 |
| 2008/0047613 A1* | 2/2008 | Huang | F16K 15/20 137/226 |

OTHER PUBLICATIONS

English translation of the Abstract for DE 102007027147 published Dec. 18, 2008.

* cited by examiner

CONNECTOR FOR TRANSFERRING AT LEAST ONE FLUID

CROSS-REFERENCE TO RELATED APPLICATION

This application is the 35 U.S.C. §371 national stage application of PCT Application No. PCT/EP2014/064105, filed Jul. 2, 2014, which claims priority to and the benefit of, EP Patent Application No. 13176984.6, filed Jul. 18, 2013, both of which are herein incorporated by reference in their entirety.

FIELD OF THE DISCLOSURE

The present invention generally relates to the field of sealing conveyance of a fluid, for example, a gas, from a fixed conduit to an apparatus that rotates with respect to the fixed conduit, or to the transfer of a pneumatic pressure from a fixed conduit to an apparatus that rotates with respect to the fixed conduit. More particularly, the device relates to a connector for transferring a fluid or a pneumatic pressure from a fixed conduit to a rotating conduit.

BACKGROUND

Systems for transferring a pneumatic pressure from a fixed conduit to a rotating conduit are known, wherein a hollow rotating output shaft is rotatably coupled to a hollow fixed input shaft, and wherein one or more annular gaskets are arranged in permanent seal contact with both the input shaft and the output shaft, in order to prevent or reduce a leakage of transferred fluid or pressure into the gap between the two shafts.

The above-mentioned prior art has the drawback that the sealing gaskets are worn due to the sliding friction between the input and output shafts. This involves the need to have to frequently replace them in order to avoid or reduce the fluid leakages due to an excessive wear, but this often requires very high costs, due not only to the cost of the sealing gaskets, which may be high as such, but especially due to the labor costs to disassemble the device in which they are mounted, for example, a wheels-hub unit of a heavy vehicle, for example, a truck or articulated truck.

Another drawback of the prior art is that the gaskets, which are in continuous sliding contact with the stationary conduit and/or with the rotating conduit with respect to the stationary one, suffer from the operative temperature, thus involving a worsening of the sealing ability performance. In fact, under reduced operative temperatures in cold environments, such gaskets tend to increase the rigidity thereof, accelerating the friction wear process thereof and reducing the seal.

The absence of a wear control of such gaskets could cause leakages of the fluid to be transferred from the inlet conduit to the outlet conduit.

Furthermore, such gaskets tend to stiffen upon time, even if they are not used, thus worsening the sealing ability.

SUMMARY OF THE INVENTION

Therefore, the technical object of the present invention is to implement a connector for transferring fluids, particularly a gas, or pneumatic pressure, from a fixed inlet conduit to a rotating outlet conduit, having such characteristics as to obviate the drawbacks mentioned with reference to the prior art.

Particularly, the object of the present invention is to provide a fluid transfer connector avoiding the need to frequently replace sealing gaskets between the inlet conduit and the outlet conduit.

A further object of the invention is to implement a fluid transfer connector suitable to transfer very high pneumatic pressures from the inlet conduit to the outlet conduit during a relative rotation therebetween.

A preferred application is the pressurization and adjustment of the pressure of the vehicle tyres while the vehicle runs and while the wheels rotate.

These and other objects are achieved by a connector for transferring a fluid or a pneumatic pressure from a fixed inlet conduit to a rotating outlet conduit according to claim 1.

Some advantageous embodiments are the object of the dependent claims.

According to an aspect of the present invention, a transfer connector for transferring a fluid or for applying a pneumatic pressure from an inlet conduit to an outlet conduit that may rotate with respect to the inlet conduit, comprises a rotating shaft defining the outlet conduit therein, said rotating shaft comprising a sealing disc radially projecting from said rotating shaft.

The connector further comprises an insertion chamber to which the inlet conduit is sealingly securable, and wherein such chamber leads towards the inlet opening of the outlet conduit.

The connector comprises a first cylinder-piston assembly comprising a cylinder and a piston slidable with respect to the cylinder, in particular into said cylinder, wherein the piston has a sealing surface facing the sealing disc, and the cylinder is preferably fluidically connected or connectable to the insertion chamber.

The sealing surface of the piston is configured for abutting against said sealing disc to form a seal when it is pressed against the sealing disc.

The piston is configured to be selectively actuated between a sealing position in which the sealing surface is at a minimum distance or in contact with the sealing disc, in which a fluidic seal is implemented between said insertion chamber and said inlet opening of the rotating shaft outlet conduit, and a non-sealing position in which the sealing surface is moved away from the sealing disc, in which a fluidic seal is absent between said insertion chamber and said inlet opening of the rotating shaft of the outlet conduit of the rotating shaft.

In accordance with an embodiment, the cylinder is an annular cylinder comprising an outer cylinder wall, for example, arranged radially outwardly of said sealing disc in order to allow the free rotation thereof, an inner cylinder wall co-axial with the outer cylinder wall, an end wall connecting said outer cylinder wall and said inner cylinder wall, in which said outer cylinder wall, said inner cylinder wall, and said end wall define an inner annular cylinder space therebetween, and in which said slidable piston is an annular piston slidably received in the cylinder space and actuatable by varying the pressure in the pressure chamber.

In accordance with an embodiment, the inner cylinder wall has a cylindrical tubular shape, and it is configured to be passed through by said rotating shaft.

In accordance with an embodiment, the connector comprises a sealing fluid conduit connectable to a sealing fluid source and opening into a sealing chamber defined by the piston sealing surface, by the sealing disc, and by the cylinder to transfer and pressurize a sealing fluid in said sealing chamber and to provide a sealing layer or film of sealing fluid in a sealing interspace between the piston sealing surface and an opposite sealing counter-surface of the sealing disc.

In accordance with an embodiment, the piston has a thrust surface opposite to said sealing surface, in which said thrust surface at least partially defines a pressure chamber having a piston-actuating fluid inlet for influencing said thrust surface to move the piston towards the disc between said non-sealing position and said sealing position.

In accordance with an embodiment, the sealing fluid conduit is in communication with the piston-actuating fluid conduit and a partial flow of said piston-actuating fluid forms said sealing film.

The connector may advantageously comprise an outlet chamber external to the cylinder and opposite the insertion chamber.

The outlet chamber may further comprise an outlet hole configured to be passed through by the rotating shaft.

When the annular piston is in the non-sealing position, the piston sealing surface is detached or moved away from the sealing disc mounted on the rotating shaft. In such situation, the fluid, after entering the insertion chamber through the inlet conduit, is free to leak between the rotating shaft and the inlet opening, then to pass through an interspace between the rotating shaft and the inner cylindrical wall, then to pass through the space between the piston sealing surface and the sealing disc, then to pass between the sealing disc and the outer cylinder wall, and finally to advance by leaking out between the rotating shaft and the outlet opening.

In other terms, when the sealing surface of the annular piston is detached or moved away from the sealing disc mounted on the rotating shaft, no seal is implemented between the inlet conduit and the outlet opening. In other terms, in this configuration of seal absence, the fluid entering the insertion chamber prefers to pass through the pathway described above rather than through the outlet conduit.

Instead, when the annular piston is in the sealing position, in which the sealing surface is at a minimum distance or in contact with the sealing disc, the fluid is stopped by the seal between the annular piston and the sealing disc, and therefore the fluid, after being leaked between the rotating shaft and the inlet opening downstream of the insertion chamber, cannot further proceed towards the outlet opening. On the contrary, such fluid will be invited to pass through the hollow rotating shaft, and therefore through the outlet conduit.

Valve means arranged along the outlet conduit may establish a pressure threshold value in the insertion chamber, above which the fluid entering the insertion chamber manages to access the outlet conduit.

This allows temporarily interrupting the fluid communication between the insertion chamber and the outlet opening when it is desired to transfer a fluid or a pneumatic pressure from the inlet conduit to the outlet conduit.

The above interruption of the fluid communication would occur along the interspace between the rotating shaft and the inner cylindrical wall and about the sealing disc.

In this situation, the pressure or the fluid to be transferred is applied, through the inlet conduit, to the insertion chamber, and therefore to an opening of the outlet conduit formed by the hollow rotating shaft, in which such opening puts in fluidic communication the insertion chamber with the outlet conduit.

The fluid or the pneumatic pressure in the insertion chamber would tend to escape through the interspace between the rotating shaft and the cylinder towards the outlet opening.

However, such leakage is prevented or at least strongly reduced by the sealing engagement between the annular piston and the sealing disc.

The only temporarily sealing engagement and the possibility to control the pressure of the sealing engagement between the piston and the sealing disc solves the friction wear problem, and allows applying extremely high pressures from the inlet conduit towards the outlet conduit.

Once the desired amount of fluid has been transferred, or a desired pressure in the outlet conduit or in an application downstream of the outlet conduit has been reached, for example, in a tyre, an undesired fluid reflux may be avoided through valve means, for example through a check valve, associated to the application downstream or to the outlet conduit.

In such a manner, therefore, it is not necessary to permanently maintain the pressure in the insertion chamber or to permanently maintain the sealing engagement between the piston and the sealing disc.

Advantageously, the connector according to the invention, besides allowing the transfer of a fluid from a stationary conduit to a conduit that may rotate with respect to the stationary conduit, similarly allows transferring a fluid from a rotating conduit to a stationary conduit. In other terms, it also allows an inverse pathway.

For example, such connector may be also used to deflate a wheel during the movement of the vehicle.

Furthermore, such connector, besides allowing to transfer a fluid from an inlet conduit to an outlet conduit to increase the pressure in the outlet conduit, for example to inflate a wheel, also allows suctioning a gas from the outlet conduit towards the inlet conduit, for example, to obtain a vacuum in the outlet conduit.

According to a possible embodiment, the connector according to the invention may be used to obtain a seal that is temporary and driven between a rotating shaft and a fixed structure supporting the rotating shaft. For example, the connector according to the invention may be used to achieve a seal between an axis of a propeller in a watercraft or a ship. In such a case, the propeller axis replaces the rotating shaft.

BRIEF DESCRIPTION OF THE DRAWINGS

These and other features and advantages of the present invention will be apparent from the appended drawings, which illustrate embodiments of the invention, and, together with the general description of the invention above, and the detailed description of the embodiments given below, serve to explain the principles of the present invention.

DETAILED DESCRIPTION OF THE PREFERRED EMBODIMENTS

Figure 1:
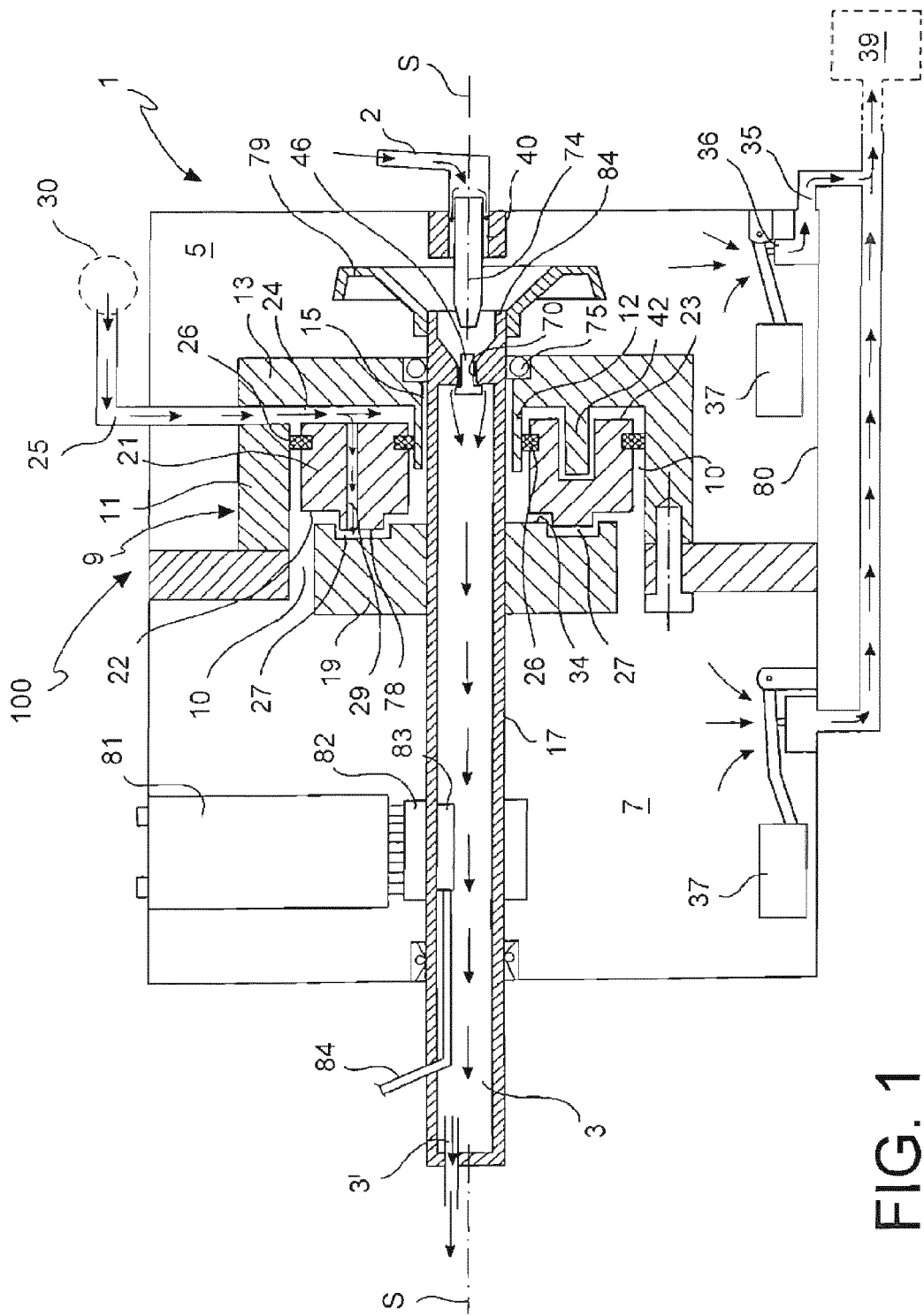
FIG. 1 is a schematic cross-sectional view of a fluid transfer connector according to an embodiment of the invention, having a sealing cylinder-piston unit.

With reference to FIGS. 1 to 7, a connector for transferring a fluid or a pneumatic pressure from an inlet conduit 2 to an outlet conduit 3 that may rotate with respect to the inlet conduit 2 comprises a rotating shaft 17 defining the outlet conduit 3 therein that has an inlet opening 70 and defines a rotational axis (S-S).

The rotating shaft 17 comprises a sealing disc 19 extending radially with respect to the rotating shaft.

According to an embodiment, the sealing disc 19 is integral with the shaft 17.

According to an embodiment, the sealing disc 19 is fixed to the shaft 17.

According to an embodiment, the connector 1 comprises means for preventing the sliding of the disc 19, or of the disc and the shaft, along the rotational axis (S-S).

The rotating shaft 17 comprises an outlet opening 3' suitable to put in communication the outlet conduit 3 with a consumption unit or an application downstream with respect to the inlet conduit 2, for example a wheel the pressure of which is to be controlled, or any consumption unit that needs such fluid to be transferred.

The connector comprises an insertion chamber 5 leading towards the inlet opening 70 of the outlet conduit 3, to which the inlet conduit 2 is sealingly connectable.

The connector further comprises a cylinder-piston assembly 100 comprising a cylinder 9 and a piston 21 slidable in the cylinder 9, in which the piston 21 has a sealing surface 22 facing the sealing disc 19, and in which the cylinder 9 is fluidically connected to the insertion chamber 5, for example through an interspace 15 between the rotating shaft 17 and an inner cylinder wall 12 (FIGS. 1 to 6).

The piston 21 is configured to be selectively actuated between a sealing position between the inlet conduit 2 and the outlet conduit 3, and a non-sealing position between the inlet conduit 2 and the outlet conduit 3.

In the sealing position, the sealing surface 22 is at a minimum distance or in contact with the sealing disc 19 implementing a fluidic seal between the insertion chamber 5 and the inlet opening 70 of the outlet conduit 3 of the rotating shaft 17.

In the sealing position the sealing surface 22 of the piston is at a minimum distance or in contact with the sealing disc 19, preventing the fluid to pass between the sealing surface 22 of the piston and the sealing disc 19, and forcing the fluid to pass between said insertion chamber 5 and the outlet conduit 3 of the rotating shaft 17 through said inlet opening 70.

In the non-sealing position, the sealing surface 19 is moved away or detached from the sealing disc 19 by removing a fluidic seal between the insertion chamber 5 and the inlet opening 70 of the rotating shaft of the outlet conduit 3 of the rotating shaft 17.

In the non-sealing position between the shaft 2 and the structure 3 the sealing surface 22 is moved away from the sealing disc 19, allowing a fluid to pass through the connector between the shaft and the structure.

This allows temporarily interrupting the seal in the fluid communication pathway between the insertion chamber 5 and the external environment when the transfer of fluid or of pneumatic pressurization is actuated from the inlet conduit 2 to the outlet conduit 3. Precisely, the fluid communication pathway could occur along the interspace 15 between the rotating shaft 17 and an inner cylinder wall 12, and between the sealing disc 19 and the cylinder 9 (for example FIGS. 1-6).

Through the inlet conduit 2, the pressure to be transferred or the fluid to be transferred is brought in the insertion chamber 5 and to the inlet opening 70 of the conduit 3 extending in the insertion chamber 5. The fluid or pneumatic pressure in the insertion chamber 5 would tend to escape through the interspace between the rotating shaft 17 and the inner cylinder wall 12 outwardly. However, such dispersion is prevented or at least strongly reduced by the engagement seal between the piston 21 and the sealing disc 19.

The fact that the sealing engagement is only temporary, and the possibility to control the pressure of the sealing engagement between the piston 21 and the sealing disc 19 (that rotates together with the rotating shaft 17 with respect to an outer housing of the cylinder-piston unit that remains stationary) solves the friction wear problem and allows transferring high pressures from the inlet conduit 2 to the outlet conduit 3 during the relative rotation therebetween.

Once a desired amount of fluid has been transferred, or the pneumatic desired pressure is reached in the outlet conduit 3 in an application (for example, a tyre) downstream of the outlet conduit 3, an undesired reflux of fluid may be avoided through valve means 46, for example by a check valve, connected with the application downstream or the outlet conduit 3. Therefore, it is not necessary to permanently maintain the pressure in the insertion chamber 5 or to permanently maintain the sealing engagement between the piston 21 and the sealing disc 19.

According to an embodiment of a connector according to the invention, the rotating shaft 17 within which the outlet conduit 3 is obtained, has a first free end inserted in the insertion chamber 5, in which such free end comprises the inlet opening 70 of the outlet conduit 3.

Figure 2:
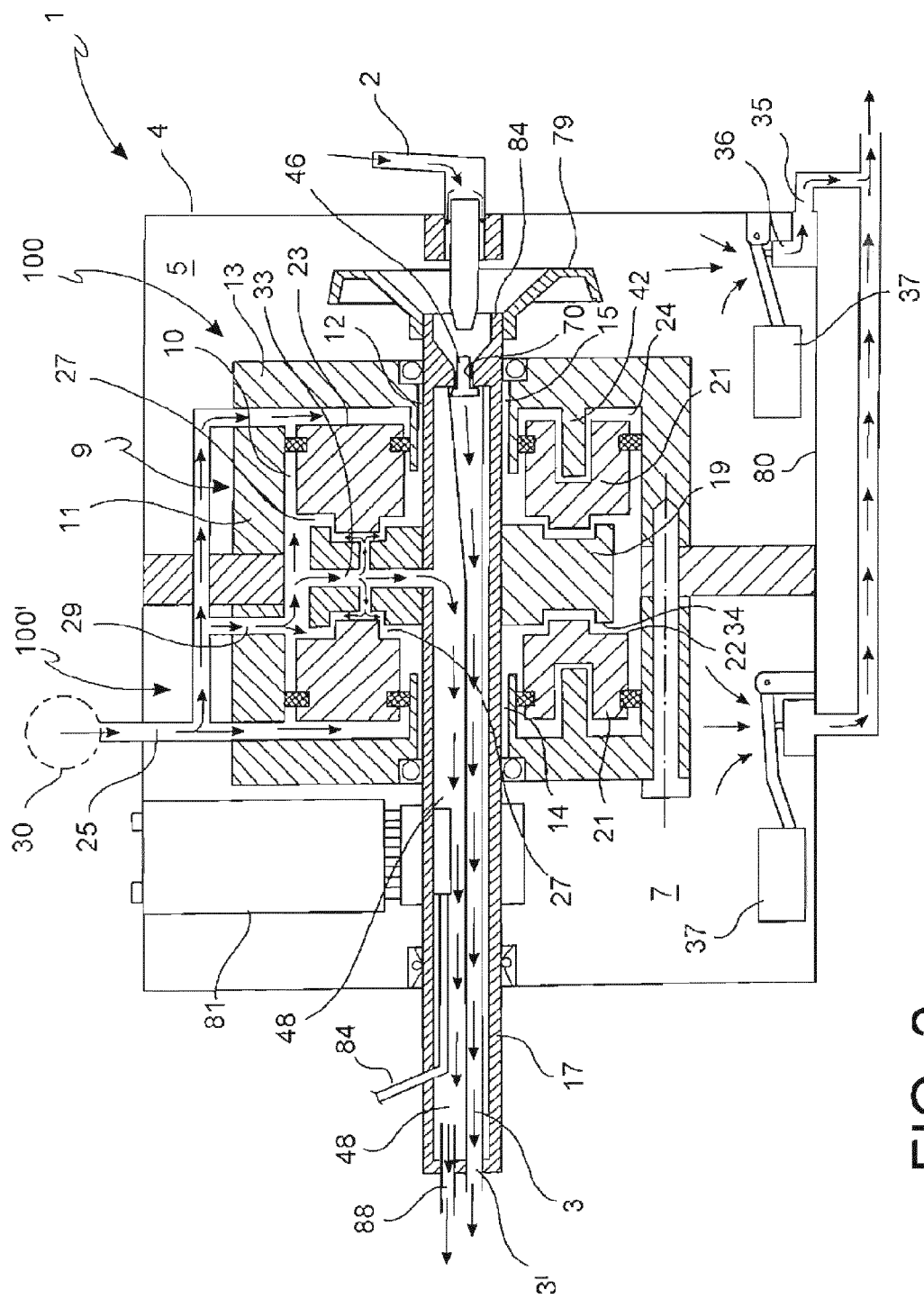
FIG. 2 is a schematic cross-sectional view of a fluid transfer connector in accordance with a further embodiment of the invention, having two sealing cylinder-piston units.
Figure 6:
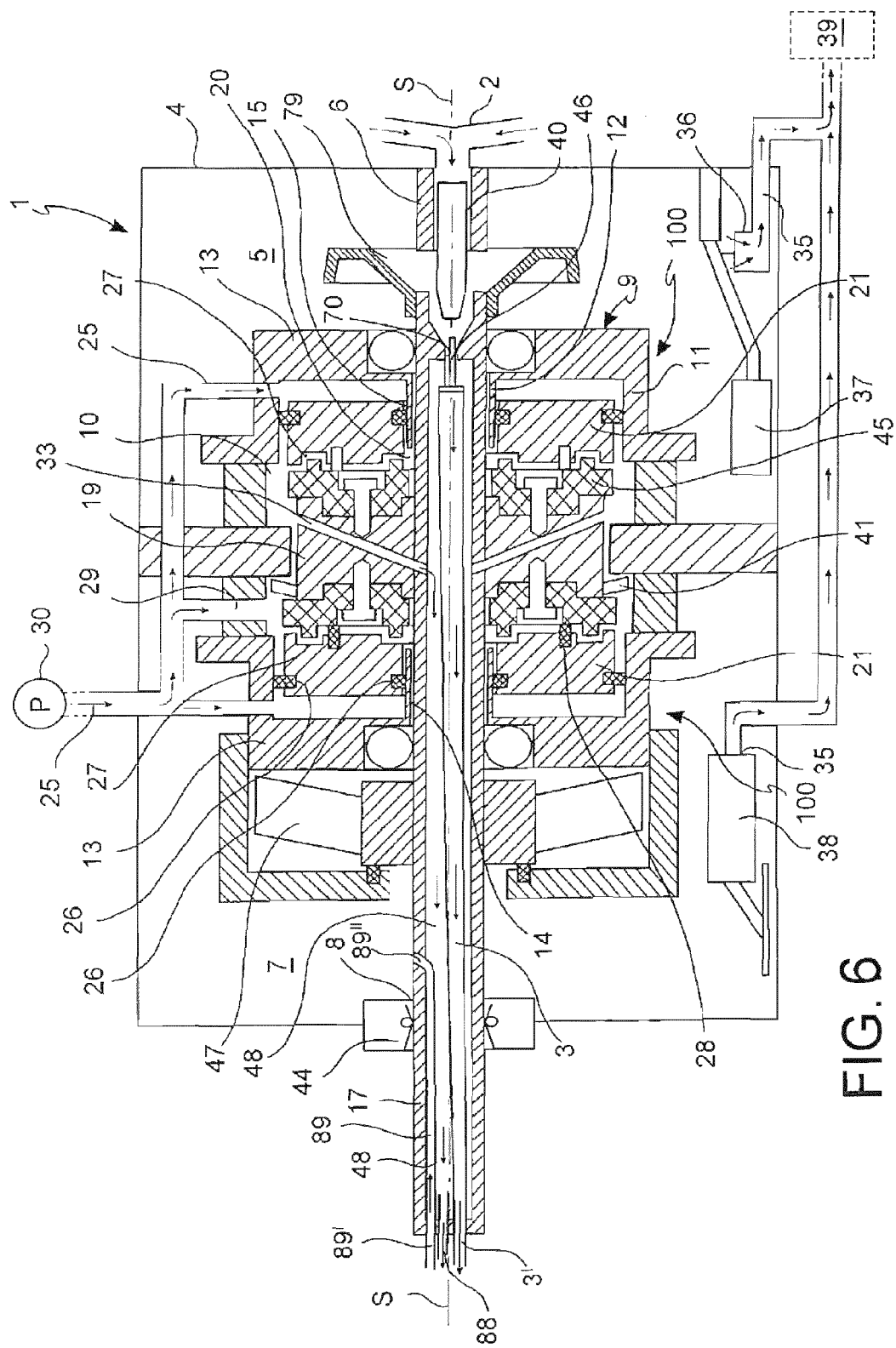
FIG. 6 illustrates a connector as in FIG. 2, comprising a conduit obliquely passing through the disc to supply a fluid amount within the rotating shaft.

Such a configuration of the connector according to the invention, shown in FIGS. 1, 2, 6, in which the rotating shaft 17 has a free end arranged in the insertion chamber 5 and a second free end extending outside the connector 1, is particularly suitable for transferring a pneumatic pressure or fluid from a stationary part of a machine to a rotating part of the machine, or from the structure of a vehicle to a wheel supported by a monolateral hub. For example, such a configuration is suitable to inflate or to bring to pressure a vehicle tyre, on an axle shaft, for example, a steering axle shaft.

The valve means 46 comprise a check valve suitable to open/close the inlet opening 70.

According to a possible embodiment, the check valve 46 is actuatable by a actuation piston 74, inserted in an end of the inlet conduit 2, so as to be urged against the valve 46 by the pressure of the fluid entering the inlet conduit 2.

The actuation piston 74 may be electrically controlled, for example, by a solenoid, to control the application of pneumatic pressure or the transfer of fluid from the inlet conduit 2 to the outlet conduit 3.

In such a manner, the check valve 46 is actuated only upon exceeding a preset fluid pressure, or at a preset fluid flow rate, through the inlet conduit.

In other terms, the valve means 46 are configured to open the fluid passageway between the insertion chamber 5 and the outlet conduit 3 only under preset conditions of pressure and flow rate of the entering fluid, particularly when the piston 21 is in the sealing position.

In still other terms, the valve means 46 are configured to open the fluid passage between the insertion chamber 5 and the outlet conduit 3 upon exceeding a preset pressure threshold of the fluid in the insertion chamber 5, or upon exceeding a preset value of the difference between the pressure in the insertion chamber 5 and the pressure in the outlet conduit 3.

Alternatively, the valve means 46 may comprise an electrovalve, for example driven by an external control unit, for example, to allow the fluid passage from the insertion chamber 5 to the outlet conduit 3 only when the piston 21 is in the sealing position.

In the connector shown in FIGS. 1 to 7, the cylinder 9 is an annular cylinder comprising an outer cylinder wall 11 arranged radially outer with respect to the sealing disc 19 allowing the free rotation thereof with respect to the cylinder 9, an inner cylinder wall 12 co-axial with the outer cylinder wall 11, an end wall 13 connecting the outer cylinder wall 11 with the inner cylinder wall 12.

The outer cylinder wall 11, the inner cylinder wall 12 and the end wall 13 define therebetween an inner annular cylinder space 10.

Particularly, the slidable piston 21 may be an annular piston slidably received into the cylinder space 10 and actuatable by varying the pressure in the pressure chamber 24.

The inner cylinder wall 12 may be in a cylindrical tubular shape and configured to be passed through by the rotating shaft 17.

The inner cylinder wall has a length value as measured in a direction parallel to the axis S-S such as to allow the free rotation of the sealing disc 19 and the rotating shaft.

The inner cylinder tubular wall 12 is configured to allow the rotation of the rotating shaft 17 therein. Particularly, such inner cylinder tubular wall is configured to leave an interspace 15 or a passageway between it and the rotating shaft 17.

A rolling bearing 75 interposed between the rotating shaft 17 and the inner cylinder tubular wall 12 rotatably supports the rotating shaft 17. Alternatively, the rolling bearing 75 may be interposed between the rotating shaft 17 and the end wall 13.

According to an embodiment, the outer cylinder wall 11 may be in a cylindrical tubular shape.

The connector may comprise a sealing fluid conduit 29 connectable to a sealing fluid source 30, for example a sealing fluid pump, and opening into a sealing chamber 27 defined by the sealing surface 22 of the piston 21, by the sealing disc 19 by the cylinder 9 for transferring and pressurizing a sealing fluid in the sealing chamber 27. In such a manner, such sealing fluid generates a sealing layer or film of sealing fluid in a sealing interspace between the sealing surface 22 of the piston and an opposite sealing counter-surface 34 of the sealing disc 19.

In such a manner, an amount of sealing fluid, by passing through the sealing conduit 29, reaches the sealing chamber between the sealing surface of the piston 22 and the sealing counter-surface 34 of the sealing disc 19. Such sealing fluid is, for example, an oil with such a viscosity as to form a fluid layer between the sealing surface of the piston, which is stationary, and the sealing counter-surface of the disc 19, which, instead, rotates. The presence of such sealing fluid in the sealing chamber prevent the fluid entering through the inlet conduit 2 from leaking out of the insertion chamber 5 through the bearing 75, the interspace 15, the sealing chamber 27, forcing such fluid to pass through the only opening available, which is the inlet opening 70 of the outlet conduit.

In other terms, such sealing fluid cooperates with the pressure exerted by the piston 21 against the disc 19, thus forming a seal between the piston 21 and the disc 19, when the piston 21 is in the sealing position.

For this reason, and as it will be further described below, to achieve an excellent seal, it will not always be necessary to bring the piston 21 to directly contact the sealing disc 19, but the piston may remain at a distance from the disc 19 that is equal to the thickness of the sealing layer or film of sealing fluid that is formed between the sealing surface 22 of the piston 21 and the sealing counter-surface 34 of the disc.

Advantageously, the sealing layer or film of sealing fluid that is formed between the sealing surface 22 of the piston 21 and the sealing counter-surface 34 of the disc 19 allows avoiding the direct contact between the piston 21, which is generally stationary, and the rotating disc 19, avoiding in such a manner the sliding friction wear therebetween.

In order to improve the seal between the sealing surface 22 of the piston 21 and the sealing counter-surface 34 of the disc 19, the sealing surface 22 of the piston and/or the sealing counter-surface 34 of the disc may have annular reliefs 78 about the rotational axis S-S, to make the contact between such surfaces more uniform.

Particularly, the piston sealing surface 22 and the disc sealing counter-surface 34 may be shaped in a complementary manner to increase the contact area therebetween and therefore to improve the seal.

The piston 21 also comprises a thrust surface 23 opposite to the sealing surface 22, and such thrust surface 23 at least partially defines a pressure chamber 24 having a piston-actuating fluid inlet 25 for influencing the thrust surface 23 to move the piston 21 against the disc 19 between said non-sealing position and said sealing position.

In accordance with an embodiment shown in the figures, the sealing fluid conduit 29 is in communication with the piston-actuating fluid conduit 25, and a partial flow of the piston-actuating fluid 25 forms the sealing layer or film.

In this case, the sealing fluid corresponds to the piston-actuating fluid.

In accordance with an embodiment, the piston-actuating fluid is selected from a liquid and a gas. For example the piston actuation fluid is a liquid selected from oil, for example, for use as an hydraulic actuation, grease, water. It is preferred that the piston-actuating fluid is a liquid or a grease, since the higher viscosity thereof allows obtaining a better seal between the inlet conduit and the outlet conduit, above all when the sealing fluid coincides with the piston-actuating fluid. A fluid having a high density and/or a high viscosity is particularly suitable for use as a sealing fluid, since, besides allowing a better seal, it also allows not to be mixed with the fluid to be transferred between the inlet conduit and the outlet conduit. However, this does not exclude the use of a gas as the sealing fluid.

The sealing fluid conduit 29 may extend in a branched manner within at least one between the piston 21 and the disc 19 leading to different points of the sealing chamber 27. In such a manner, the sealing fluid may be suitably distributed and form a homogeneous sealing fluid layer.

In accordance with an embodiment, at least one between the piston 22 and the sealing disc 19 forms, for example internally to the piston and/or to the sealing disc, a sealing fluid conduit 33 having an inlet arranged radially external to the sealing surface 22 or to the sealing counter-surface 34 and opening in the sealing chamber 27 to form said sealing film.

The piston 21 is shaped so that an effective thrust area of the thrust surface of the piston 23 is larger than an effective thrust area of the sealing surface of the piston 22 to allow the piston 21 to be displaced against the pressure of the sealing fluid in the sealing position. In such a manner, it is avoided that the pressure of the sealing liquid in the sealing chamber 27 cancels, or overcomes, the force to displace the piston 21 to its sealing position.

The fact that the pressure of the sealing fluid and/or the pressure of the piston actuation fluid is higher than the pressure of the fluid to be transferred between the inlet conduit and the outlet conduit, ensures achieving a seal that prevents, in the seal, leakages of the fluid to be transferred between the inlet conduit and the outlet conduit, also when such fluid to be transferred is a gas.

The connector, as shown in the FIGS. 1, 2, and 6, may comprise a deflecting plate 79 mounted at the free end of the rotating shaft 17 arranged in the insertion chamber 5, about the inlet opening 70 of the rotating shaft. This deflecting plate 79 has as its aim to deflect a possible reflux of piston-actuating fluid from the thrust chamber 24 to the insertion chamber 5, so as to prevent a mixing of such piston-actuating fluid with the fluid entering through the inlet conduit 2.

In the case that the piston-actuating fluid is a liquid, for example, oil, such fluid, after being refluxed in the insertion chamber 5 and after being deflected by the deflecting plate 79 precipitates downwardly in the insertion chamber 5 and it is received by a collection portion 80 of the insertion chamber 5.

The insertion chamber 5 may be provided with a discharge opening 35 with a corresponding discharge valve 36 to discharge the residual fluid formed by the piston-actuating fluid leaked in the insertion chamber 5 or by a part of the liquid to be transferred from the inlet conduit 2 to the outlet conduit 3 that has leaked in the insertion chamber 5 through the interspace 15, or liquid by a part of fluid/liquid to be transferred from the inlet conduit 2 to the outlet conduit 3, fallen in the insertion chamber at the inlet opening 70 of the outlet conduit 3, or left in the insertion chamber. 5 after the completion of the fluid transfer.

The discharge valve 36 may be automatically actuated by valve control means, for example, by an actuator actuated by a level of the liquid 37, for example, by a floating switch.

A discharge electric pump 38 (shown in FIG. 6) may be provided for the removal of such residual fluid in a fluid tank 39. Such tank may be connected to a recirculation circuit that brings such entering residual fluid back to the piston actuation fluid conduit 25, or to the sealing fluid conduit 25, for example, by means of the sealing fluid pump 30.

According to an embodiment, for example shown in FIG. 6, the connector may comprise a return conduit 89 configured to allow the return of the fluid from the outlet conduit 3 to the fluid tank 39, so as to form a closed fluid circuit. Such an application turns out to be very useful, for example, in the case that a fluid circuit within the wheel is implemented, for example to heat or cool the wheel during the vehicle motion.

In accordance with an embodiment, the return conduit 89 comprises an outlet 89" leading to the outlet chamber 7 so as to direct said fluid in said outlet chamber 7 to be able to be then received and conveyed by the pump 38 to the tank 39.

In accordance with an embodiment, the piston 21 may be provided with inner and outer annular gaskets 26 arranged in the interspace between the piston 21 and the inner cylinder wall 12 and the outer cylinder wall 11 to hermetically isolate the pressure chamber 24 from the sealing chamber 27, particularly defined by the sealing surface 22 of the piston 21, the rotating shaft 17, the sealing disc 19, and the cylinder 9.

The piston 21 may be locked so as not to rotate with respect to the cylinder 9 or, alternatively, the piston 21 may be allowed to rotate with respect to the cylinder 9. In both cases, the annular gaskets 26 are not subjected to friction and wear permanently, but only when the piston 21 temporarily moves with respect to the cylinder 9.

In accordance with a further embodiment, the piston 21 may be provided with at least one front annular gasket 28 (shown in FIG. 6, for example) housed in the sealing surface 22 and extending about the rotating shaft 17, suitable to sealingly engage the sealing disc 19 when the piston 21 is in the sealing position. Also, this at least one front gasket 28 is not subjected to a permanent friction wear, but only during the sealing.

In the embodiment in which the piston 21 is free to rotate together with the sealing disc 19 within the cylinder 9, the at least one front gasket 28 is almost statically stressed.

In the embodiment in which the piston 21 is prevented from rotating together with the sealing disc 19 within the cylinder 9, the at least one front gasket 28 is subjected to friction wear only when the piston 21 is in the sealing position.

In such a case, the connector comprises at least one slidable engaging member 42, 43 that allows the piston 21 to slide with respect to the cylinder 9 along the rotational axis S-S, but prevents the piston 21 from rotating with respect to the cylinder 9 about the rotational axis S-S.

For example, the slidable engagement is a projecting member 43 integral to the cylinder 9 and slidably engaged to a corresponding slot in the piston 21 in a direction parallel to the rotational axis S-S (shown, for example, in the FIGS. 1, 2, 3, 4, 5, 7).

According to an embodiment, at least one front gasket may be provided on the disc sealing surface 34 (not shown). Particularly, such at least one front gasket in the disc sealing surface may be present in addition or in replacement to the front gasket 28 in the piston 21.

Particularly, the front gaskets 28 may be not necessary in the case that the sealing film is sufficient to form a seal under operative conditions.

In such a case, the important advantage is obtained, of not having to replace such gaskets, thus decreasing the connector maintenance costs.

In accordance with an embodiment shown in FIG. 1, 2, the connector 1 may comprise an electric connector 81 comprising a stationary portion 82 with respect to the inlet conduit 2, and a rotating portion 83 integral to the rotating shaft 17, in which the stationary portion 82 is in electric communication with the rotating portion 83. Different lengths of electric or electronic circuits may be connected to the stationary portion 82 and the rotating portion 83. For example, such electric connector may connect an electric power source and/or an electrical central unit integral to the inlet conduit 2 and sensors or consumption units integral to the outlet conduit 3, for example, mounted in a wheel of a vehicle which is fixed to the rotating shaft 17.

The rotating portion 83 may be connected to a consumption unit of the wheel, for example, via the cable 84.

The stationary portion 82 and the rotating portion 83 may be electrically connected together through sliding contacts or through electromagnetic or induction magnetic contacts.

In accordance with an embodiment, shown in FIG. 2, two cylinder-piston assemblies 100 are arranged on two opposite sides of the sealing disc 19 and adapted to be displaced in sealing engagement with the sealing disc 19 on both sides of the sealing disc 19, thus creating two sealing barriers to interrupt the fluid communication between the inlet conduit 2 and the outlet conduit 3.

Each cylinder-piston assembly 100 of this embodiment may have the same characteristics of the above-described cylinder-piston assembly.

In the connector of this second embodiment, two annular pistons 21 are slidably housed in the cylinder 9 on two opposite sides of the sealing disc 19 and each piston 21 defines a pressure chamber 24 together with the cylinder 9.

The fluid conduit of piston-actuating fluid 25, or two independent conduits of piston-actuating fluid 25 lead to the thrust chambers 24 to pressurize such thrust chambers 24 to displace the pistons 21 on both sides in sealing engagement with the sealing disc 19, thus creating two sealing barriers for selectively interrupting or opening the fluid communication between the insertion chamber 5 and the outlet conduit 3.

The connector 1, as shown in FIG. 2, may comprise an outlet chamber 7, arranged on the opposite side of the cylinder-piston assembly 100 with respect to the insertion chamber 5. Particularly, such outlet chamber 7 is passed through in inlet and outlet from the rotating shaft 17, and it is suitable to collect residual fluid that possibly leaks through an outlet passage 14 of the cylinder-piston assembly 100 arranged on a side opposite to the cylinder-piston assembly arranged in the proximity of the first free end 84 of the rotating shaft 17.

In accordance with a further embodiment (FIGS. 2, 6), the rotating shaft 17 defines an inner auxiliary conduit 48 that is separated from the outlet conduit 3 and that has an opening leading into the sealing chamber 27 of the cylinder 9 for conveying the sealing fluid from the sealing chamber 27 to an outlet port 88 of the sealing fluid outside the rotating shaft 17 (for example, for supplying lubricating oil or sealing fluid in a tyre intended to be pressurized) or for dispensing or supplying the sealing liquid in the sealing chamber 27 of a plurality of cylinders 9 through the same rotating shaft 17.

Figure 3:
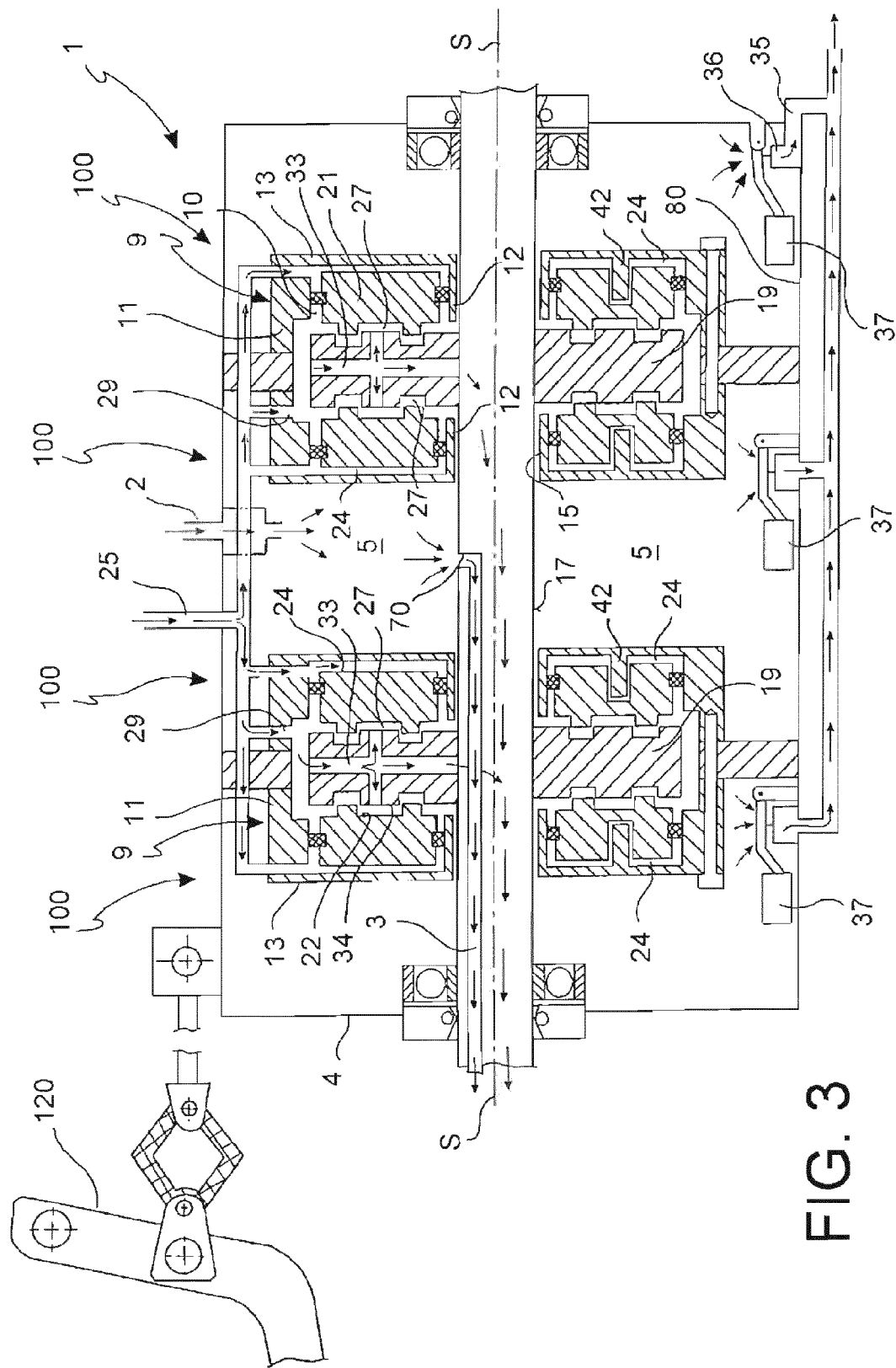
FIG. 3 shows a connector according to the invention, having two pairs of cylinder-piston units.

According to an embodiment, for example shown in FIG. 3, two pairs of cylinder-piston assemblies 100 as described above are mounted along a same rotating shaft 17, within which the outlet conduit 3 is defined.

Such embodiment is particularly advantageous in the case that the rotating shaft 17 is the axle of a vehicle, joining two opposite wheels of the vehicle, particularly in the case of an axle for driving wheels.

This embodiment differs from the embodiments of the preceding figures in that the insertion chamber 5 is interposed between two pairs of cylinder-piston assemblies 100. As for the embodiments described in the preceding figures, the insertion chamber 5 is sealingly securable to the inlet conduit 2 and leads to the inlet opening 70 of the outlet conduit 3. Therefore, both the inlet conduit 2 and the inlet opening 70 of the outlet conduit are interposed between the two pairs of cylinder-piston assemblies 100.

Also elastic suspension means 120 are shown in FIG. 3, which are suitable to elastically connect the connector 1 according to the invention, or particularly a case 4 containing the connector, to a fixed structure, for example, a vehicle.

Figure 4:
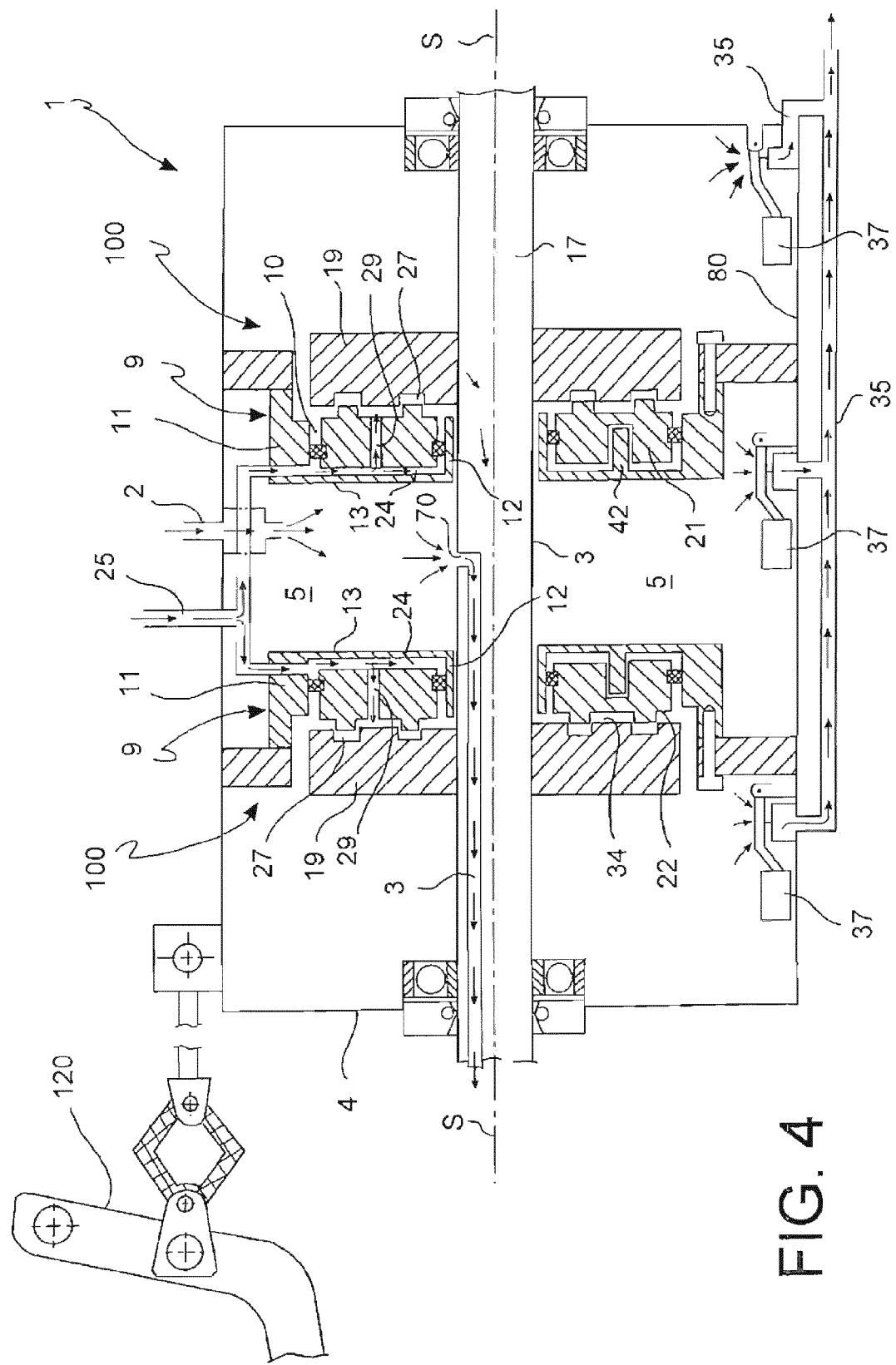
FIG. 4 shows a connector having two cylinder-piston units cooperating with two distinct sealing discs.

The FIG. 4 shows an embodiment of a connector according to the present invention, comprising two single cylinder-piston assemblies mounted on a same rotating shaft 17.

Each cylinder-piston unit is implemented according to the characteristics of the connector of FIG. 1.

The insertion chamber 5 is interposed between two cylinder-piston assemblies 100, particularly specularly mutually arranged. The insertion chamber 5 is sealingly securable to the inlet conduit 2 and leads to the inlet opening 70 of the outlet conduit 3. Therefore, both the inlet conduit 2 and the inlet opening 70 of the outlet conduit are interposed between the two cylinder-piston assemblies 100 formed each by a single piston 21 and a single sealing disc 19.

Figure 5:
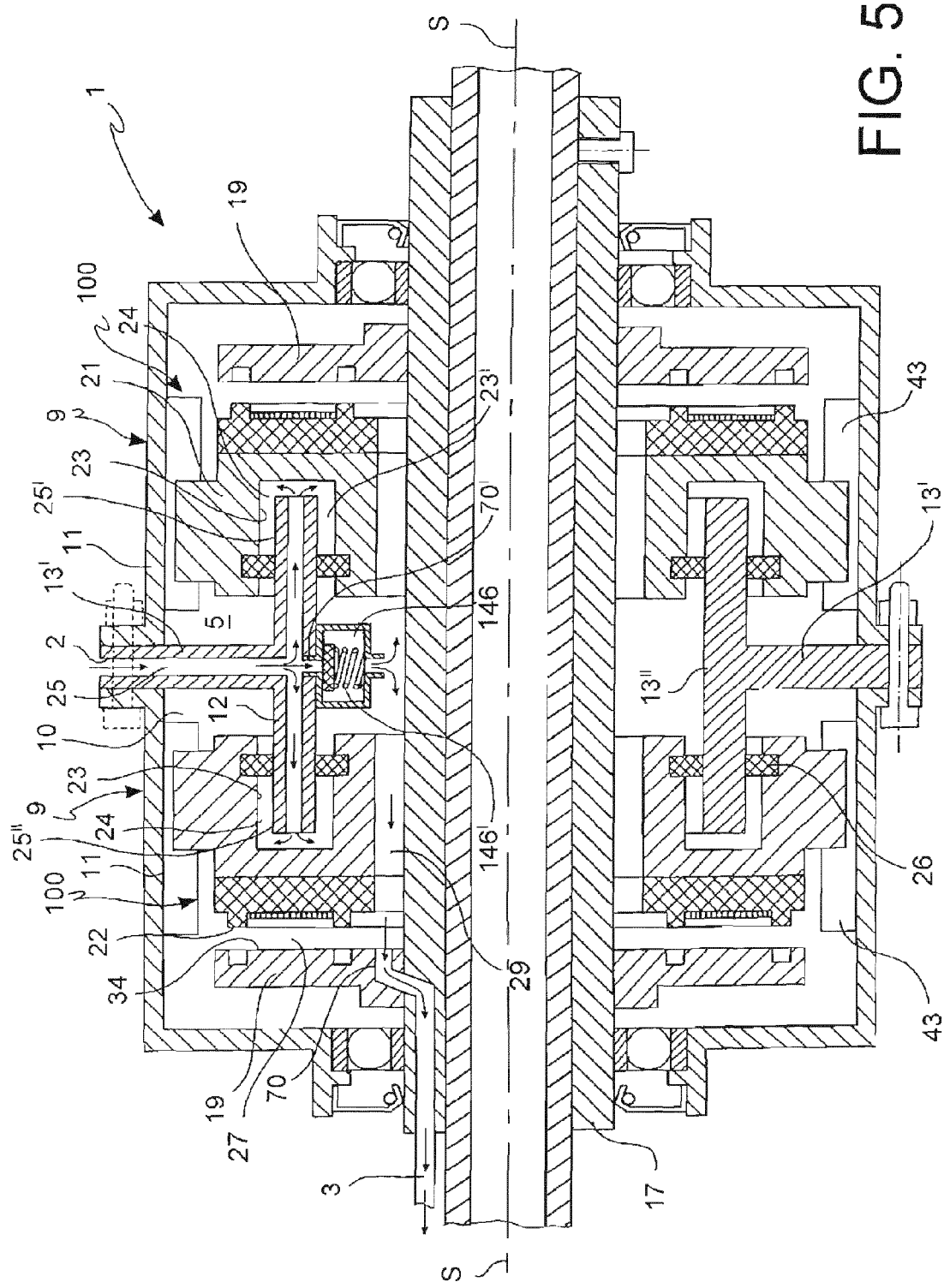
FIG. 5 shows an embodiment of a connector according to the invention, having two cylinder-piston units and two sealing discs.

A possible embodiment of the connector 1 according to the invention is shown, for example, but without limitation, in FIG. 5, in which two cylinder-piston assemblies are mounted on a same rotating shaft 17. The two cylinder-piston assemblies 100 are mounted specularly to one another. Particularly, the inlet conduit 2 has two different opposite outlets, each of said outlets facing a thrust chamber 24 interposed between said each of said outlets and the thrust surface 23 of respective one of said pistons 21. Therefore, the insertion conduit 2 separates into two opposite branches that extend parallel to the rotational axis S-S of the rotating shaft 17, each of them towards a respective piston 21.

The thrust surface 23 of each of the two pistons 21 may be defined by a cavity 23' obtained in the piston. For example, said cavity is in a cylindrical or tubular shape.

The inlet conduit 2 leads into said cavity 23' and comprises an end branch 25', 25" at least partially arranged slidably within the cavity 23', and extending parallel to the rotational axis S-S so as to allow the piston 21 freely sliding along the rotational axis S-S.

A gasket 26', particularly, may be interposed between the end branch 25', 25" and the cavity 23'.

Advantageously, the cavity 23' together with the end branch 25', 25" forms a thrust chamber 24 to push the piston 21 against the sealing disc 19.

Alternatively, the cavity 23', together with the end branch 25', 25" and the gasket 26', forms a thrust chamber 24 to push the piston 21 against the sealing disc 19.

In the example represented in the figure, two distinct cylindrical pistons 21 and two distinct sealing discs 19 are present, in which the pistons 21 are arranged in a central area of the connector, while the discs 19 are arranged on opposite sides with respect to said central area. When the pressure in the pressure chambers 24 exceeds a threshold value, the pistons 21 move axially away from each other outwardly of the connector and therefore towards the discs 19.

In the example represented in FIG. 5, two opposite sealing barriers are formed between the inlet conduit 2 and the outlet conduit 3.

A support member 13' may be provided, comprising a tubular portion 13" having opposite ends, so configured as to be slidably couplable with the cavities 23' of the pistons.

According to an embodiment, the inlet conduit 2 is obtained within said support member 13'.

Furthermore, the insertion chamber 5 is interposed between the inlet conduit 2 and the outlet conduit 3 through an opening 70' in the inlet conduit 2, which puts in fluidic communication the inlet conduit 2 with the insertion chamber 5.

Valve means 46 are arranged at the opening 70', and are configured to open the fluid passage way from the inlet conduit 2 to the outlet conduit 3 only after the pistons 21 completed their movement stroke towards the respective sealing discs 19, therefore only when the pistons reach the sealing position.

According to an embodiment, the valve means 146 comprise a second check valve, for example a normally closed check valve. Such valve is kept closed by virtue of the elastic action of a spring 146'. When the pressure of the fluid within the inlet conduit 2 exceeds the elastic reaction of the spring 146' of the valve 146, the fluid opens the valve 146 flowing in the outlet conduit 3.

By adjusting or selecting the elastic force of the spring 46' so that the valve 46 opens only after the pistons have reached the sealing position, an automatic system is achieved, which implements the transfer of fluid from the inlet conduit 2 to the outlet conduit 3 only when the seal therebetween has been formed.

FIG. 6 shows an example of the connector 1 having two cylinder-piston units 100 suitable to act on opposite sides on a same sealing disc 19. The embodiment of FIG. 6 differs from the one in FIG. 2 for the presence of a sealing fluid conduit 33 passing through the sealing disc 19 extending in a sloped manner with respect to the rotational axis S-S between a radially outer position of the disc and a secondary conduit 48 within the rotating shaft 17, to direct a thrust fluid towards a consumption unit integral to the outlet conduit 3.

According to an embodiment, for example shown in FIG. 6, an impeller 41 is formed along an outer periphery of the sealing disc 19 so that, when the rotating shaft 17 rotates with respect to the cylinder 9 in a predetermined direction, it pumps the sealing or piston-actuating fluid against the leakage thereof through the interspace between the rotating shaft and the end wall 13.

According to an embodiment shown for example in FIG. 6, the connector 1 may comprise an impeller 47 coupled on the rotating shaft 17 suitable to generate an air flow opposing to the outward fluid leakage from the thrust chamber 24 outwardly through the interspace 14.

According to an embodiment, the sealing disc 19 may have a low-friction coating 45 forming the sealing surface of the piston 21 and/or forming a counter-surface of the rotating disc 19. For example, such coating is a PTFE coating applied to said sealing surface 22 or said sealing counter-surface 34, or in replaceable PTFE plates frontally secured to said piston 21 and/or said rotating disc 19.

The connector 1 described above from the viewpoint of the technical features will be now described from the viewpoint of the operation thereof.

In rest conditions, thus when a sealing connection between the inlet conduit 2 and the outlet conduit 3 is not desired, the piston, or the pistons 21, are in the non-sealing position. The rotating shaft 17 is free to rotate, and no contact is established between the sealing disc 19 and the pistons 21.

On the other hand, when it is desired to implement a sealing connection between the inlet conduit 2 and the outlet conduit 3, for example to inflate a vehicle tyre during the vehicle drive, the piston-actuating fluid is pressurized until moving the pistons 21 forward against the sealing disc 19. At the same time, in those embodiments in which it is provided, the sealing fluid, which may be or not the same piston-actuating fluid is pressurized, generating a fluid layer between the sealing surface 22 of the piston 21 and the sealing counter-surface of the rotating disc 19. In such a manner, the fluidic seal between the insertion chamber 5 and the outlet conduit 3 is generated. At this point, the passageway between the inlet conduit 2 and the outlet conduit 3 is opened, for example by acting on the valve 46.

In such a manner, it is possible to transfer the fluid from the inlet conduit 2 to the outlet conduit 3, which is rotating with respect to the inlet conduit 2, while a temporary seal is implemented.

Figure 7:
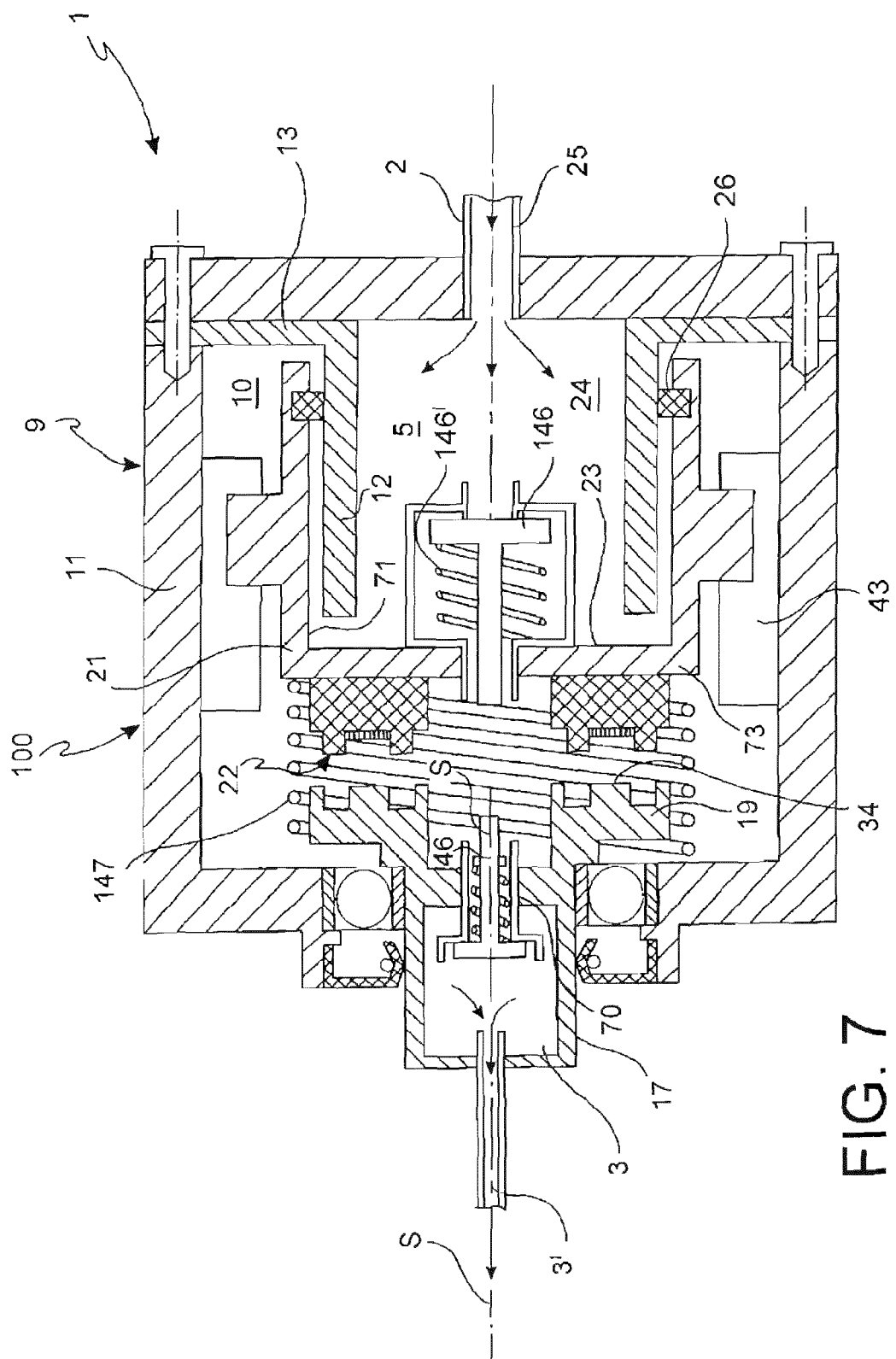
FIG. 7 illustrates in a sectional view a further embodiment of a connector according to the invention, in which the piston-actuating fluid coincides with the fluid to be transferred between the inlet conduit and the outlet conduit.

In accordance with an embodiment of the connector 1, for example shown in FIG. 7, the insertion chamber 5 is contained within said inner cylinder wall 12, and the piston 21 is hollow and cup-shaped having an inner cavity 71 slidably coupled outside said inner cylinder wall 12, so that, as the pressure in the insertion chamber 5 increases, the piston 21 is urged against the sealing disc 19. In other words, according to this embodiment, the pressure chamber 24 is defined by the insertion chamber 5.

In accordance with an embodiment, the piston 21 comprises a second check valve 146 mounted astride of a head portion 73, suitable to open a fluid passage through said head portion 73 between the insertion chamber 5 and the inlet opening 70 in the outlet conduit 3.

In accordance with an embodiment, the second check valve 146 is mounted aligned to said valve 46, and said second valve 146 is actuatable at a pressure value in the insertion chamber 5 higher than a pressure value necessary to displace the piston, so that said second valve opens a passageway for the fluid only when the piston is in said sealing position.

In such a manner, as the fluid pressure in the insertion chamber 5 increases, the second valve 146 remains closed until reaching a preset pressure value. While the valve 146 is closed, the pressure of the fluid pushing against the thrust surface 23 of the piston moves the piston 21 advancing towards the sealing disc 19. When the piston 21 has reached the sealing disc 19, the progression of such piston is stopped by the sealing disc 19. As the fluid pressure against the thrust surface 23 of the piston 21 further increases, and as the pressure in the insertion chamber 5 contained in the inner cylinder wall 12 increases, such pressure reaches a pressure value above which the valve 146 opens. Such valve 146 is configured so that when the piston 21 is in the sealing position, when the valve 146 is actuated to open, it actuates to open also the valve 46. In such a manner, the fluid passage between the inlet conduit 2 and the outlet conduit 3 is opened.

The valve 146 is a valve that opens when the pressure to which it is subjected exceeds the elastic force exerted by an expansion spring 146' contained in such valve 146. Thus, the valve 146 opens only upon exceeding a preset value pressure in the insertion chamber.

In this case also, the connector 1 opens the passage between the inlet conduit 2 and the outlet conduit 3 only when the piston 21 is in the sealing position.

In this case also, the connector 1 automatically opens the fluid passage between the inlet conduit 2 and the outlet conduit 3.

According to an embodiment, a return spring 147 may be arranged between the piston 21 and the cylinder 9, particularly between the piston 21 and a wall 113 rotatably supporting the rotating shaft 17, to displace the piston 21 from the sealing position to the non-sealing position or rest position.

Figure 8:
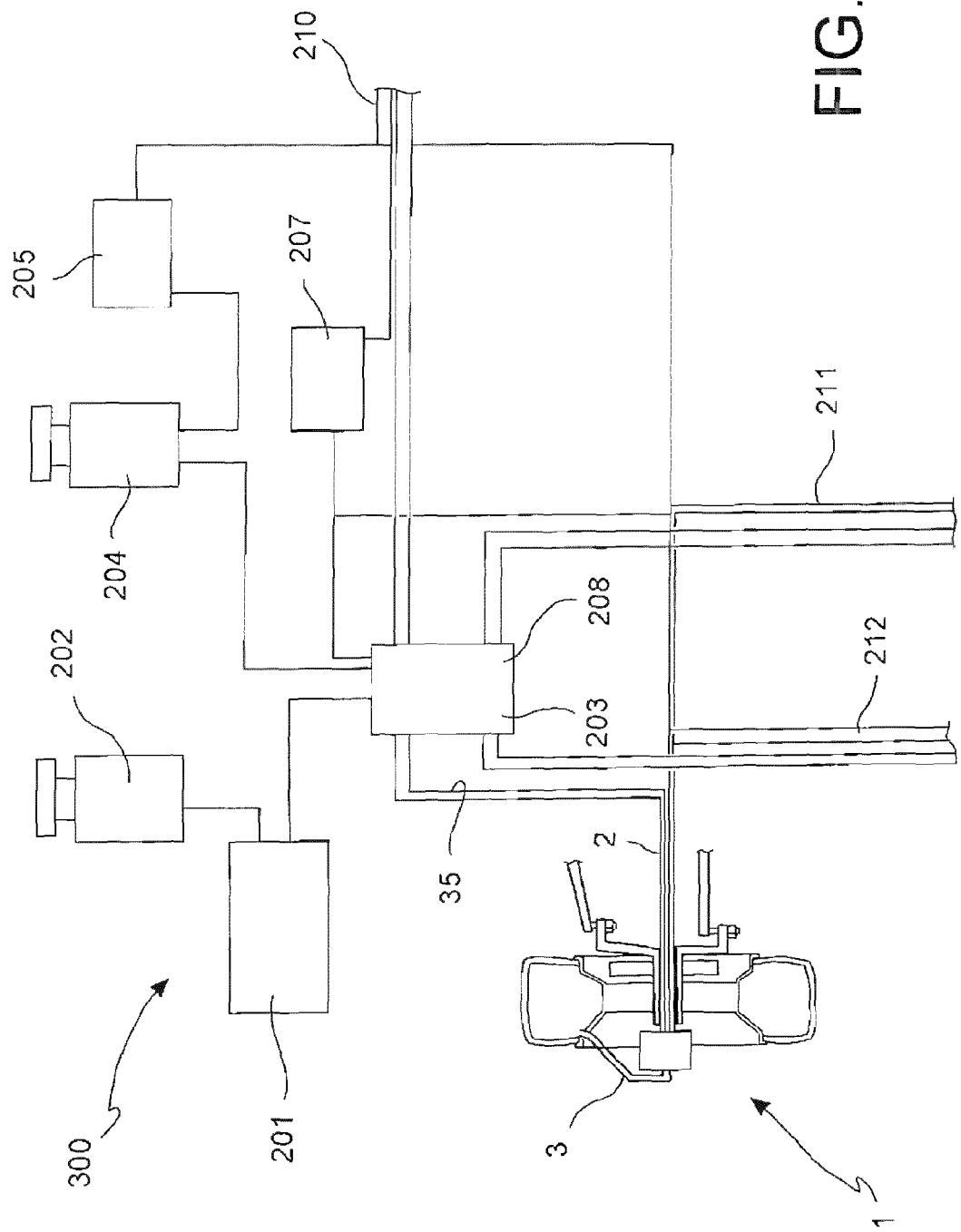
FIG. 8 schematically shows a pressurization apparatus for pressurizing a vehicle tyre comprising a connector according to the invention.

An example of application of a connector between an inlet conduit and an outlet conduit that may rotate with respect to the inlet conduit is provided in FIG. 8.

Particularly, the connector may be used to bring to a desired pressure or to pressurize or inflate a tyre mounted on a vehicle, during the drive of the vehicle. Therefore, this device allows avoiding stopping the vehicle, connecting a pressurized air source to the tyre, and carrying out the pressurization in such a manner.

A pressurization apparatus 300 of a tyre during the stroke of a vehicle supported by such tyre, may comprise a pressurized air source 201, for example, a tank of pressurized air connected to a pressurized air blower 202. A pressurized air dispenser 203 may be provided, interposed between the pressurized air source 4 and the inlet conduit 2, for example, to control the pressure in the inlet conduit 2 for example to form the seal and to subsequently open the passage between the inlet conduit 2 and the outlet conduit 3. In the case that the connector 1 requires a piston-actuating fluid that is different from the fluid to be transferred between the inlet conduit 2 and the outlet conduit 3, for example, such piston-actuating fluid being a hydraulic oil, a pressure pump 204 is provided to pressurize such fluid. The pressure pump 204 could be connected to a piston-actuating fluid tank 205, in which such tank 205 is for example upstream of the pressure pump 204. The pressure pump 204 is connected to the piston-actuating fluid conduit 25 of the connector 1, so as to act as to displace the piston 21 and form the seal. Between the pressure pump 204 and the connector 1, a dispenser 208 of piston-actuating fluid may be interposed, to adjust the pressure to actuate the piston or the pistons 21. The dispenser 203 and the dispenser 208 may be integrated in a single dispenser as schematically shown in FIG. 8. A central control unit 207, for example, a computing unit, may control the dispenser 203 and/or 208. The control unit 207, as well as the pumps and the dispenser may, for example, but not necessarily, be supplied by external electric sources via the lines 210.

The dispenser may have, for example, but not necessarily, outlet fluid lines 211, 212 to supply other consumption units.

The connector 1 and the apparatus 300 may be mounted on a pre-existent vehicle, to modify such vehicle. In fact, on large commercial vehicles such as, for example, a truck or an articulated truck, both a apparatus for providing pressurized air and a apparatus for providing pressurized oil to actuate hydraulic pistons are generally present.

The portion of the apparatus comprising the pressure pump 204 to pressurize the piston-actuating fluid may not be present, in the case that the piston-actuating fluid is the same of the fluid to be transferred between the inlet conduit and the outlet conduit, as for the embodiments in FIGS. 5, 7, for example.

The present invention may also relate to a vehicle comprising such connector 1 and such pressurization apparatus 300.

In accordance with a possible embodiment, the rotating shaft 17 is a shaft of a propeller for propelling, for example an amphibious vehicle, or a ship, or a sloop, or a submarine. In such a case, the seal is implemented only temporarily by actuating the piston 21 against the rotating disc, for example only when it is required by a temporary immersion, while the seal is deactivated when it is not required, allowing to protect gaskets, if present, or the mechanical parts in a temporary sliding. Such a device may be used also to implement a seal between the wheel axles of an amphibious means and its structure, for example its hull.

In other terms, according to an embodiment, the outlet conduit 3 is replaced by a shaft or axle of a propeller for propelling a vehicle, particularly an amphibious vehicle, and the inlet conduit 2 is replaced by a structure of said vehicle.

According to an embodiment, the connector (1) is designed to achieve a watertight connection between a rotating shaft, in particular an axle of a propeller, and a structure of a vehicle, in particular an amphibious vehicle, wherein the shaft may rotate with respect to the structure 2, in which the connector 1 comprises:

the rotating shaft 17 defining a rotation axis S-S and comprising a sealing disc 19 extending radially from said rotating shaft 17;

at least one first cylinder-piston assembly 100 comprising a cylinder 9 and a piston 21 slidable into said cylinder 9, said piston 21 having a sealing surface 22 facing the sealing disc 19 and suitable for abutting against a sealing counter-surface 34 of the sealing disc 19, said piston 21 being configured to be selectively operated between:

a sealing position between the shaft 2 and the structure 3 in which the sealing surface 22 of the piston is pressed against a sealing counter-surface 34 of the sealing disc, preventing a fluid to pass through the connector between the shaft and the structure, and a non-sealing position between the shaft 2 and the structure 3 in which the sealing surface 22 is moved away from the sealing disc 19, allowing a fluid to pass through the connector between the shaft and the structure.

According to an embodiment the connector 1 comprises a sealing fluid conduit 29 connectable to a sealing fluid source 30 and opening into a sealing chamber 27 at least partially defined by the sealing surface 22 of the piston 21 and by an opposite sealing counter-surface 34 of the sealing disc 19, for transferring and pressurizing a sealing fluid in said sealing chamber 27 and forming a sealing layer or a film of sealing fluid between said sealing surface 22 of the piston 3 and said sealing counter-surface 34 of the disc 19, as described above.

Among the various advantages given by the present invention, the following ones may be identified.

The actuation of the connector may be fully automatic and configurable so that the sealing occurs only when preset pressure values in the inlet conduit are exceeded, or upon exceeding given pressure difference values between the inlet conduit and the outlet conduit.

The operation of configuring such connector may take place by selecting the elastic constants of the springs of the valve means 46 and/or the check valve 146.

In the case of use with a running tyre, if the tyre is pierced, the continuous insufflation of an air flow rate in the tyre could match or exceed the air flow rate exiting the hole, avoiding that the tyre deflates until reaching a destination.

By controlling the air flow rate input to the tyre when it is driven, the wear of the same tyre may be optimized, besides saving fuel by virtue of an optimal pressure level within the tyre. In such a manner, the pressure in the tyre may be also adjusted according to the vehicle weight.

A connector according to the invention may be mounted to the vehicle structure, avoiding having to replace it when the wheel is replaced.

To the above-described preferred embodiments of the device, those skilled in the art, with the aim of meeting contingent, specific needs, will be able to make a number of modifications, adaptations, and replacements of elements with other functionally equivalent ones, without however departing from the scope of the following claims.

The invention claimed is:

1. A connector for transferring at least one fluid, or for applying a pneumatic pressure, from an inlet conduit to an outlet conduit that is configured to rotate with respect to the inlet conduit, in which the connector comprises:

a rotating shaft defining the outlet conduit therein, which has an inlet opening, said rotating shaft defining a rotation axis and comprising a sealing disc extending radially from said rotating shaft;

an insertion chamber to which said inlet conduit is sealingly securable, said insertion chamber leading to said inlet opening of the outlet conduit;

at least one first cylinder-piston assembly comprising a cylinder and a piston slidable with respect to the cylinder, said piston having a sealing surface facing the sealing disc and being configured for abutting against said sealing disc;

wherein the sealing disc is fixed to, or integral with, the shaft;

said piston being configured to be selectively operated between:

a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening;

and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening.

2. The connector according to claim 1, wherein said cylinder is an annular cylinder comprising an outer cylinder wall arranged in order to allow a free rotation of the sealing disc with respect to outer cylindrical wall, an inner cylinder wall co-axial with the outer cylinder wall, an end wall connecting said outer cylinder wall and said inner cylinder wall, wherein said outer cylinder wall, said inner cylinder wall, and said end wall define therebetween an inner annular cylinder space; and wherein said slidable piston is an annular piston slidably received into the cylinder space in a direction parallel to the rotational axis and actuatable by varying the pressure in a pressure chamber.

3. The connector according to claim 2, wherein said inner cylinder wall has cylindrical tubular shape and it is configured to accommodate said rotating shaft.

4. The connector according to claim 1, wherein the rotating shaft defines an inner auxiliary conduit, separated from the outlet conduit and having an opening that opens into the sealing chamber of the cylinder.

5. A connector for transferring at least one fluid, or for applying a pneumatic pressure, from an inlet conduit to an outlet conduit that is configured to rotate with respect to the inlet conduit, in which the connector comprises:

a rotating shaft defining the outlet conduit therein, which has an inlet opening, said rotating shaft defining a rotation axis and comprising a sealing disc extending radially from said rotating shaft;

an insertion chamber to which said inlet conduit is sealingly securable, said insertion chamber leading to said inlet opening of the outlet conduit;

at least one first cylinder-piston assembly comprising a cylinder and a piston slidable with respect to the cylinder, said piston having a sealing surface facing the sealing disc and being configured for abutting against said sealing disc;

said piston being configured to be selectively operated between:

a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening; and and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening; and comprising a sealing fluid conduit connectable to a sealing fluid source and opening into a sealing chamber at least partially defined by the sealing surface of the piston and by an opposite sealing counter-surface of the sealing disc, for transferring and pressurizing a sealing fluid in said sealing chamber and forming a sealing layer or a sealing film of sealing fluid between said sealing surface of the piston and said opposite sealing counter-surface of the sealing disc.

6. The connector according to claim 5, wherein said piston has a thrust surface opposite to said sealing surface, in which said thrust surface at least partially defines a pressure chamber having a piston-actuating fluid inlet for influencing said thrust surface to move the piston towards the disc between said non-sealing position and said sealing position.

7. The connector according to claim 6, wherein said sealing fluid conduit is in communication with the conduit of the piston-actuating fluid and a partial flow of said piston-actuating fluid forms said sealing film.

8. The connector according to claim 5, wherein the piston is shaped so that an effective thrust area of the thrust surface of the piston is larger than an effective thrust area of the sealing surface of the piston to allow the piston to be displaced against the pressure of the sealing fluid.

9. The connector according to claim 5, wherein at least one between the piston and the sealing disc forms or comprises a sealing fluid conduit having an inlet arranged radially external to the sealing surface or to an opposite sealing counter-surface of the sealing disc and an opening in the sealing chamber to form said sealing film.

10. The connector according to claim 5, wherein said cylinder is an annular cylinder comprising an outer cylinder wall arranged in order to allow a free rotation of the sealing disc with respect to outer cylindrical wall, an inner cylinder wall co-axial with the outer cylinder wall, an end wall connecting said outer cylinder wall and said inner cylinder wall, wherein said outer cylinder wall, said inner cylinder wall, and said end wall define there between an inner annular cylinder space; and wherein said slidable piston is an annular piston slidably received into the cylinder space in a direction parallel to the rotational axis and actuatable by varying the pressure in a pressure chamber.

11. The connector according to claim 10, wherein said inner cylinder wall has cylindrical tubular shape and it is configured to accommodate said rotating shaft.

12. The connector according to claim 10, wherein said insertion chamber is contained within said inner cylinder wall, and the piston is hollow and cup-shaped, having an inner cavity slidably coupled outside said inner cylinder wall so that, as the pressure in the insertion chamber increases, the piston is urged against the sealing disc.

13. The connector according to claim 5, wherein the rotating shaft defines an inner auxiliary conduit, separated from the outlet conduit and having an opening that opens into the sealing chamber of the cylinder.

14. A connector for transferring at least one fluid, or for applying a pneumatic pressure, from an inlet conduit to an outlet conduit that is configured to rotate with respect to the inlet conduit, in which the connector comprises:
- a rotating shaft defining the outlet conduit therein, which has an inlet opening, said rotating shaft defining a rotation axis and comprising a sealing disc extending radially from said rotating shaft;
- an insertion chamber to which said inlet conduit is sealingly securable, said insertion chamber leading to said inlet opening of the outlet conduit;
- at least one first cylinder-piston assembly comprising a cylinder and a piston slidable with respect to the cylinder, said piston having a sealing surface facing the sealing disc and being configured for abutting against said sealing disc;
- said piston being configured to be selectively operated between:
- a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening;
- and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening;
- wherein said piston has a thrust surface opposite to said sealing surface, in which said thrust surface at least partially defines a pressure chamber having a piston-actuating fluid inlet for influencing said thrust surface to move the piston towards the disc between said non-sealing position and said sealing position; and
- wherein a sealing fluid conduit is in communication with the conduit of the piston-actuating fluid and a partial flow of said piston-actuating fluid forms a sealing film between the sealing surface and the sealing disc in the sealing position.

15. A connector for transferring at least one fluid, or for applying a pneumatic pressure, from an inlet conduit to an outlet conduit that is configured to rotate with respect to the inlet conduit, in which the connector comprises:
- a rotating shaft defining the outlet conduit therein, which has an inlet opening, said rotating shaft defining a rotation axis and comprising a sealing disc extending radially from said rotating shaft;
- an insertion chamber to which said inlet conduit is sealingly securable, said insertion chamber leading to said inlet opening of the outlet conduit;
- at least one first cylinder-piston assembly comprising a cylinder and a piston slidable with respect to the cylinder, said piston having a sealing surface facing the sealing disc and being configured for abutting against said sealing disc;
- said piston being configured to be selectively operated between:
- a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening;
- and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening; and
- wherein said outlet conduit comprises valve means configured to open a fluid passageway between said insertion chamber and said outlet conduit when said piston is in the sealing position.

16. The connector according to claim 15, wherein said valve means are configured to open a fluid passageway between said insertion chamber and said outlet conduit upon exceeding a preset pressure threshold of said fluid in the insertion chamber, or upon exceeding a preset value of a difference between the pressure in the insertion chamber and the pressure in the outlet conduit.

17. A connector for transferring at least one fluid, or for applying a pneumatic pressure, from an inlet conduit to an outlet conduit that is configured to rotate with respect to the inlet conduit, in which the connector comprises:
- a rotating shaft defining the outlet conduit therein, which has an inlet opening, said rotating shaft defining a rotation axis and comprising a sealing disc extending radially from said rotating shaft;
- an insertion chamber to which said inlet conduit is sealingly securable, said insertion chamber leading to said inlet opening of the outlet conduit;
- at least one first cylinder-piston assembly comprising a cylinder and a piston slidable with respect to the cylinder, said piston having a sealing surface facing the sealing disc and being configured for abutting against said sealing disc;
- said piston being configured to be selectively operated between:
- a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening;
- and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening; and
- comprising at least one further cylinder-piston assembly configured as the first cylinder-piston assembly, wherein said piston of said first cylinder-piston assembly and said piston of a second cylinder-piston unit are arranged to face respectively two opposite sides of the sealing disc and suitable to be displaced in sealing engagement with the sealing disc in order to be able to abut against said sealing disc on both sides of the sealing disc, thus creating at least two sealing barriers to interrupt a fluid communication between the inlet conduit and the outlet conduit.

18. A connector for transferring at least one fluid, or for applying a pneumatic pressure, from an inlet conduit to an outlet conduit that is configured to rotate with respect to the inlet conduit, in which the connector comprises:
a rotating shaft defining the outlet conduit therein, which has an inlet opening, said rotating shaft defining a rotation axis and comprising a sealing disc extending radially from said rotating shaft;
an insertion chamber to which said inlet conduit is sealingly securable, said insertion chamber leading to said inlet opening of the outlet conduit;
at least one first cylinder-piston assembly comprising a cylinder and a piston slidable with respect to the cylinder, said piston having a sealing surface facing the sealing disc and being configured for abutting against said sealing disc;
said piston being configured to be selectively operated between:
a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening;
and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening;
wherein said cylinder is an annular cylinder comprising an outer cylinder wall arranged in order to allow a free rotation of the sealing disc with respect to outer cylindrical wall, an inner cylinder wall co-axial with the outer cylinder wall, an end wall connecting said outer cylinder wall and said inner cylinder wall, wherein said outer cylinder wall, said inner cylinder wall, and said end wall define therebetween an inner annular cylinder space;
wherein said slidable piston is an annular piston slidably received into the cylinder space in a direction parallel to the rotational axis and actuatable by varying the pressure in a pressure chamber; and
wherein said insertion chamber is contained within said inner cylinder wall, and the piston is hollow and cup-shaped, having an inner cavity slidably coupled outside said inner cylinder wall so that, as the pressure in the insertion chamber increases, the piston is urged against the sealing disc.

19. The connector according to claim 18, wherein the piston comprises a second check valve mounted astride of a head portion suitable to open a fluid passage through said head portion between the insertion chamber and the inlet opening in the outlet conduit, or in addition,
wherein said second check valve is mounted aligned to said valve, and said second valve is actuatable at a pressure value in the insertion chamber higher than a pressure value necessary to displace the piston, so that said second valve opens a passageway for the fluid only when the piston is in said sealing position.

20. A vehicle supportable by at least two wheels having an inflatable tyre, wherein said vehicle comprises:
a connector for transferring at least one fluid, or for applying a pneumatic pressure, from an inlet conduit to an outlet conduit that is configured to rotate with respect to the inlet conduit, in which the connector comprises:
a rotating shaft defining the outlet conduit therein, which has an inlet opening, said rotating shaft defining a rotation axis and comprising a sealing disc extending radially from said rotating shaft;
an insertion chamber to which said inlet conduit is sealingly securable, said insertion chamber leading to said inlet opening of the outlet conduit;
at least one first cylinder-piston assembly comprising a cylinder and a piston slidable with respect to the cylinder, said piston having a sealing surface facing the sealing disc and being configured for abutting against said sealing disc;
wherein the sealing disc is fixed to, or integral with, the shaft;
said piston being configured to be selectively operated between:
a sealing position, wherein a fluidic seal is achieved between the inlet conduit and the outlet conduit, and wherein the sealing surface of the piston is at a minimum distance or in contact with the sealing disc, in order to prevent at least a part of the fluid to pass between the sealing surface of the piston and the sealing disc, and to force the fluid to pass between said insertion chamber and the outlet conduit of the rotating shaft through said inlet opening;
and a non-sealing position, wherein a fluidic seal is not achieved between the inlet conduit and the outlet conduit, and wherein the sealing surface is moved away from the sealing disc, in order to allow the fluid to pass between the sealing surface of the piston and the sealing disc instead of passing between said insertion chamber and outlet conduit of the rotating shaft through said inlet opening; and
wherein the inlet conduit is connected to a pressurized air source on board of the vehicle, and said outlet conduit is connectable with the inside of said inflatable tyre, and wherein said rotating shaft is a wheel axle of the vehicle or a wheel hub of the vehicle.

* * * * *